Aug. 9, 1960 W. KUEHL 2,948,889

SELECTIVE CALL SIGNAL SYSTEM

Filed Dec. 20, 1955 3 Sheets-Sheet 1

Inventor:
WERNER KUEHL

BY

PATENT AGENT

*Inventor:*
WERNER KUEHL
BY [signature]
PATENT AGENT

SELECTIVE CALL SIGNAL SYSTEM

Inventor:
WERNER KUEHL
BY [signature]
PATENT AGENT

United States Patent Office 2,948,889

Patented Aug. 9, 1960

2,948,889

SELECTIVE CALL SIGNAL SYSTEM

Werner Kuehl, Berlin-Charlottenburg, Germany, assignor to Telefunken G.m.b.H., Berlin, Germany Filed Dec. 20, 1955, Ser. No. 554,339

Claims priority, application Germany Dec. 30, 1954

3 Claims. (Cl. 340—347)

Figure 1:
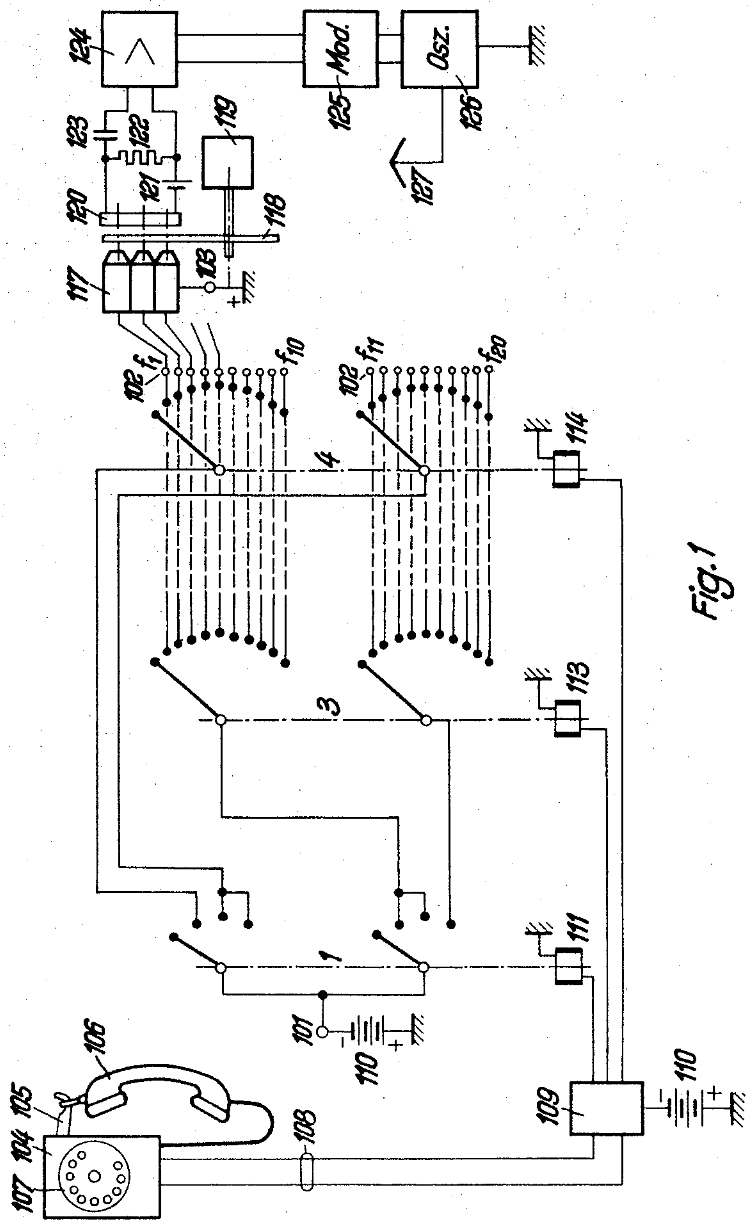

This invention relates to a call system, by which primary call signals comprising series of impulses are converted into simultaneous secondary call signals. The secondary call signals are formed by the combination of a plurality of frequencies derived from a total number of available frequencies. In order to convert the primary signal, the individual impulses of the input series operate circuit components which simultaneously transmit said combined plurality of frequencies.

In known call systems, series-connected convertors comprising relays have in general been used for converting the primary call signals. These known apparatus have circuits suffering from the disadvantage that not all of the frequencies employed can be utilized to form all of the theoretically possible frequency combinations. Moreover, such system cannot be expanded in a simple manner.

These disadvantages are avoided according to the invention in that impulse series of the primary call signals control pre-selector switches arranged in pre-selector stages, the single or plural outputs of these pre-selector switches being connected to the inputs of subordinate selector switches, and banks of subordinate selector switches are provided wherein each pre-selector switch of the pre-selector stage selects a subordinate switch in an associated bank, the subordinate selector switches being then controlled by subsequent impulses of the primary call signal. The outputs of the subordinate selector switches of the different banks are connected to form a conductor bank, of which each individual conductor is connected to a frequency generating circuit component, including a power circuit which is closed by the settings of the selector switches in the pre-selector stages and in the subordinate banks thus causing energization of said circuit components and simultaneous transmission of the frequencies of the secondary call signal.

In automatic radio telephony systems, call signals are used which are formed according to a sequence of digits, the elements of said signals being composed of series of from one to ten current impulses. In terms of permutations, the different call signals are variations of 10 dissimilar elements of the $r$th class, whereby $r$ is the number of impulse series belonging to each complete call signal. The total number of call signals obtainable in this manner is $10^r$, because a repetition of the same elements in a call signal is permissible if the signal is a permutation transmitted in time sequence. It is assumed in this case, that no disturbance occurs during the signal transmission which might result in obliteration of portions of a call signal permutation. This condition is generally fulfilled in wire transmission systems. However, in case of radio links, changes, and frequently even interruptions, in the transmission have to be taken into account, particularly within the range of short and ultra-short waves and in the case of transmission from and to mobile stations.

For this reason, the system of call signals used for wire telephony is not fully dependable when used in radio links. It is known that in case of radio networks call signals are superior which contain all of the characteristic elements of the call simultaneously, and are adapted to be transmitted for any length of time until the called station answers.

Oscillations of a number of different frequencies are used as elements of such call signals, generally audio-frequencies between 300 and 3000 cycles. For example, it has been known in a radio system to form each of the individual call signals of two to four audio-frequencies which are selected from ten to forty available audio-frequencies. Due to the simultaneous transmission of all of the frequency elements belonging to a call signal, repetition of the same element in a signal is not permissible. The same element can appear only once in each combination. For the same reason, there is no differentiation with respect to the sequence of the elements. Thus, the number of possible combinations of $p$ elements selected from a total number $n$ of available elements is $$\frac{n}{p}$$

If simultaneous-type combination signals are to be selected from a conventional permutation dialing system, by means of a digit selector requiring conversion into a call system employing simultaneously present characteristic elements, for example in a system of the type $$\begin{matrix}32\\4\end{matrix}$$

or if an available automatic wire-telephone permutation system is to be coupled with a radio using simultaneous transmission of the call signal, a circuit arrangement has to be provided which converts the primary permutation of digital signals of time sequence into secondary simultaneous combination call signals. Principally, a call circuit system is intended, which is controlled by the digital impulses in such a manner that from the available different simultaneous call elements, elements are instantly combined to form a particular combination, which is corresponding with the primary permutation call signal. If the secondary signals, as assumed, are formed by superposition of oscillations of different frequencies, the outputs of the generators supplying these oscillations have to be connected to a common terminal in accordance with the desired combination, or else the generation of only the selected frequencies must be initiated for the duration of the call.

Known systems to convert decade call signals into signals with another basic number of elements are based on the principle that first an arrangement of decade selectors is actuated in accordance with these elements, whereby certain lines at the input of a conversion system are affected by changes in potential. The changes transmitted to the output side of the conversion system serve to cause on this side calling impulses. It is possible to make the secondary call arrangement dependent on the primary call arrangement, though on the basis of a different numerical system, if the conversion system is suitably designed. Such devices are rather complex and require a large number of selector units. Therefore, simpler devices of this kind are desired, which are at the same time better suited to fulfill the requirements of conversion of wire-telephone systems to radio telephone systems, particularly in mobile stations.

It is an object of this invention to provide such a conversion arrangement.

It is a further object of the invention to provide such circuit system with $n$ outputs to convert primary call signals into secondary call signals, said primary signals having a total of $r$ elements and being formed by $m$ variations, for example 10. The primary signal may include repetition of the same elements, among the $r$ consecutive elements, preferably in a series of at most $m$, or 10 current impulses. Each of the secondary call signals will be formed as a combination of $p$ elements selected from a total number of $n$ dissimilar elements, but excluding the repetition of the same elements in a single combination, preferably in form of a call signal formed by superposition of $p$ dissimilar oscillation frequencies. The $n$ dissimilar elements of the secondary call signals are switched on via the outputs assigned to them, and preferably $n>m>p$. The outputs in groups of a number $x$ are connected to the outputs of multibank selector switches of at least $x$ banks, said selector switches being synchronously controlled by a primary selector impulse element, wherein $x \leqq m$.

It is a still further object of this invention to provide the outputs of the $p$ selector switches with multiple connections, and to connect the inputs of the individual selector switches with the outputs of one or several preselector switch stages in such a manner that the inputs of all of the said individual selector switches in combinations of $p$ inputs can each be connected through preselector switch stages to the common inputs of the preselector stages, and wherein the preselector stage or stages are controlled by the first primary selector impulse element or elements. Then each of the preselector stage or stages and selector switch groups is actuated by one of the consecutive primary selector impulse elements.

A circuit arrangement in accordance with the invention makes possible a simple and space-saving design, requiring only a relatively small number of selector switches. As a result of this, the current consumption is decreased and the supervision simplified. The new circuit arrangement can be readily adapted to convert call signals between different call systems and is primarily suited to connect decade systems with systems used in radio networks.

These and other important objects and advantageous features of the present invention will be apparent from the following detailed description and drawings, appended thereto, wherein merely for the purpose of disclosure non-limitative embodiments of the invention are set forth.

Figure 2A:
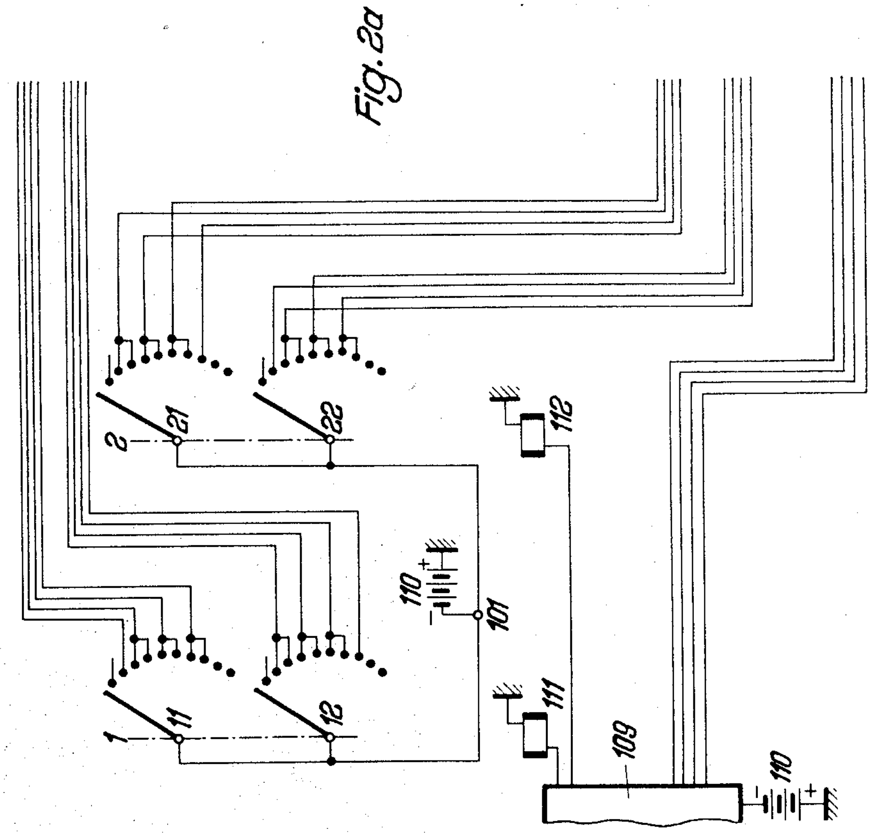
Figure 2B:
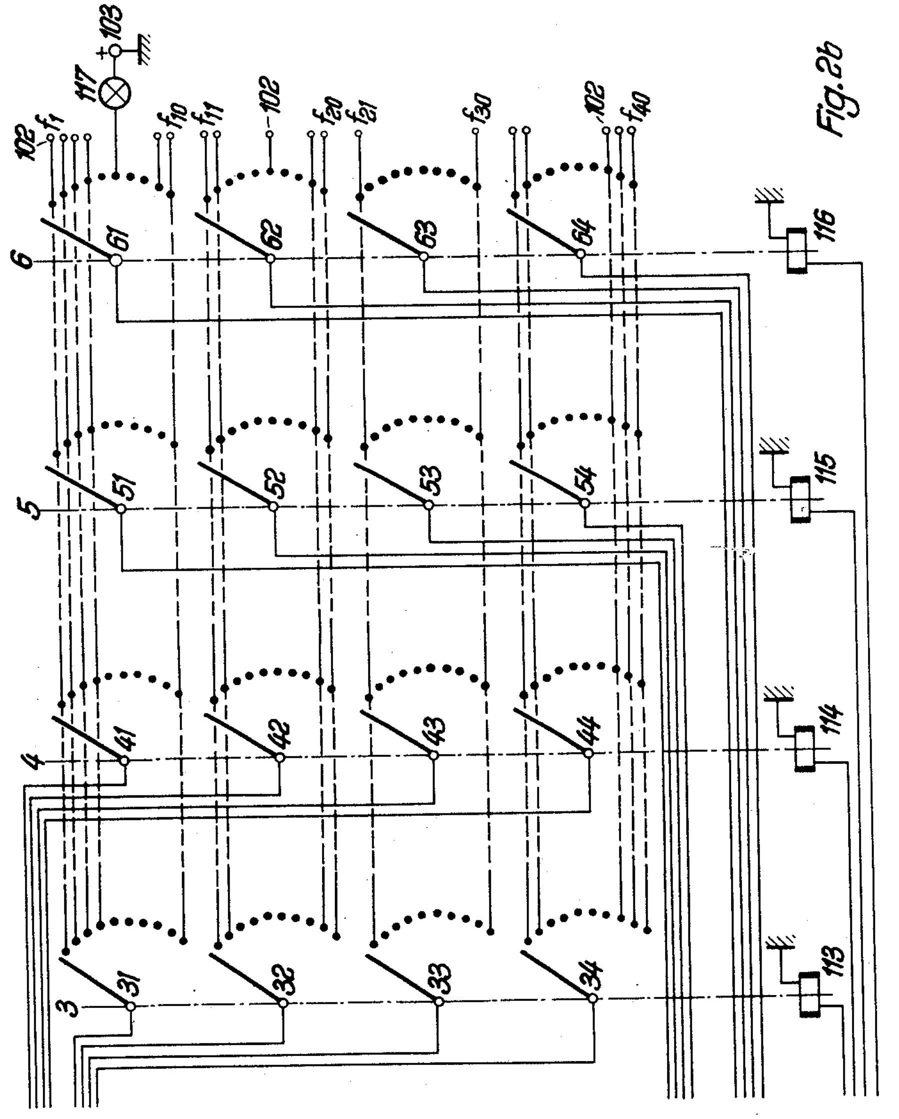

In the drawings:

Figures 1 and 2*a*, 2*b* are examples of circuit arrangements according to the invention, wherein Figures 2*a* and 2*b* represent a continuous circuit diagram to be considered as if the ends of the wires at the right or left edge, respectively, are connected with one another.

In Figure 1, a telephone set 104 of conventional structure is provided with a hook switch 105 and a microphone and receiver unit 106. The user can transmit, in a manner known per se, series of current impulses via the conductors 108 by means of the dial selector 107. The number of successive impulses in each series is the characteristic whereby a digit is selected. Call numbers comprising several such digits are presented as a succession of impulse series transmitted one after the other in accordance with the digits in the particular call number, and form a permutation of digits in time sequence.

Impulse permutations transmitted from the station 104 are received by an apparatus 109 via the conductors 108 and, possibly, via further auxiliary apparatus, such as exchange stations and the like, not shown in the drawings. This apparatus 109 constitutes in the usual manner a relay arrangement which itself is not novel. This device serves the purpose of feeding the incoming series of current impulses one after the other to the stepping magnets 111, 113, 114 of three successive selector switch stages 1, 3 and 4, so that the impulse series corresponding to the first digit of the call number is received by the stepping magnet 111, the second by the stepping magnet 113 and the third by the stepping magnet 114. Since the current impulses received via the lines 108 may be too weak to directly energize the stepping magnets, current impulses of greater amplitude are created from a local current source 110 and sent to the stepping magnets via relay means included in the apparatus 109.

Each of the selector switch stages 1, 3, 4 includes two synchronously driven selector switches on a common shaft. The inputs of the selector switches of the first stage 1 are interconnected and connected to a negative terminal 101 of the voltage source 110, the positive terminal of which is grounded. The outputs of the selector stage 1 are connected to the inputs of the selector switches on the stages 3 and 4 in such a way that it is possible to connect two of the selector switch inputs from the stages 3 and 4 in various possible combinations simultaneously to the outputs of the stage 1, and thus to the negative pole of the voltage source 110. The outputs of the stages 3 and 4 which, in the example shown, comprise 10-position selectors, are combined in groups of ten outputs in a kind of multiple circuit arrangement. For example, circuits in control of generating of the particular frequencies assigned to each output may be connected to the outputs of these two stages at the terminals 102 on the right side.

As indicated in Figure 1, a light source 117 corresponding with each terminal 102 is inserted between the output terminal 102 and the terminal 103 connected to the positive terminal of the voltage source 110 and to ground. Each of these light sources 117 has a suitable socket mounting an incandescent lamp in such a manner that the emitted light is focussed into a beam. These lamps serve to energize a multiple photo-electric tone generator, as disclosed in U.S. application to Justus Schon and Hans Mueller, Serial No. 546,703, filed November 14, 1955. To facilitate the understanding of the system, the essential parts of such photo-electric tone generator are indicated in Figure 1. It is assumed that an individual light source 117 is connected to each of the output terminals 102 assigned to each individual frequency $f_1$–$f_{10}$ and $f_{11}$–$f_{20}$ to be generated. For the sake of simplicity, only three lamps of the required 20 lamps are illustrated. The light beams emanating from the lamps are directed to a chopper disk 118 which is driven at a constant speed by a motor 119. Series of apertures are provided in the disk 118 at different radial distances from the shaft of the disk, at which distances the light beams of the respective lamps impinge on the disk. The light beams from the lamps 117 are interrupted by these series of apertures prior to impinging on a photo cell 120, common to all the light beams. The number of interruptions on the various individual circles of the disk 118 penetrated by the light beams is selected in such a manner that the frequency of interruption of the light beam always corresponds to a desired generated audio frequency.

The photo cell 120 has the property that its internal resistance changes as a function of the light intensity. This internal resistance is connected in series with the voltage source 121 and an external resistance 122 from which an A.C. voltage can be taken off by means of a condenser 123. This A.C. voltage contains the desired frequency components comprising the output combination of call signals emitted simultaneously and superimposed with respect to one another, said components being determined by the energizing of the respective lamps 117. This output combination of signals can be amplified in the usual manner by means of an amplifier 124, whereupon it is fed to a modulator 125 to modulate a high frequency transmitter. The high frequency carrier modulated with the audio frequency call signals is then radiated by means of an antenna 127. Only those modulation frequencies are present at any particular instant of time as correspond with the respective incandescent lamps which are supplied by current from the selector mechanism of the above described novel converter circuit.

The operation and control of the individual selector stages 1, 3 and 4, shown in Figure 1, can be compared with that of a known selector system of an automatic telephone exchange. As shown in Figure 1, the selector stage 1 is in rest position. If the first impulse sequence contains only one impulse, the wiper arms of switch stage 1 will be connected to the upper inputs of the two selector switches of the stages 3 and 4 in response to the said impulse of the series corresponding with the first digit in the permutation sequence. This means that the selected two oscillation frequencies must belong to the groups $f_1$–$f_{10}$. The selector stages 3 and 4 will then be moved to positions corresponding with these two frequencies by the next impulse series, so that the corresponding incandescent lamps 117 will be supplied with current. However, if the first impulse sequence comprises two successive impulses, the selector switch of the upper stage 3 and the selector switch of the lower stage 4 will be energized by the pre-selector stage 1. Consequently, of the frequencies to be finally determined, one frequency has to belong to the group $f_1$–$f_{10}$ and the other to the group $f_{11}$–$f_{20}$. On the other hand, if the first impulse sequence has three successive impulses, the lower selector switches of the groups 3 and 4 will be connected to the output of pre-selector switch 1 and the two frequencies to be determined will then both have to belong to the group $f_{11}$–$f_{20}$.

It will be recognized that this conversion system is very suitable to a combination of secondary call signals corresponding to the type of 20 digits taken 2 at a time, by which 190 secondary call signals can be produced. In many cases, such a system is sufficient for smaller radio telephone networks. In the system described, the selector stage 1 and the selector stages 3 and 4 serve different purposes. The selector stage 1 may be termed a preselector stage, because the individual inputs of the subsequent selector stages are connected to the input stage 1 in accordance with the requirements of the combination desired. For this purpose, the outputs of a selector switch of a preselector stage are connected to the inputs of a subsequent selector group and the outputs of another selector switch of the same preselector stage are connected to the inputs of a selector switch group subsequent to the first selector switch group.

Figs. 2*a* and 2*b* show a circuit arrangement based on the same principle, in which decade call signals consisting of impulse series are converted into a call system of the type of 40 digits taken 4 at a time. In this circuit arrangement, the two preselector stages 1 and 2 and subsequent selector groups 3, 4, 5 and 6 are provided. These preselector stages serve the same purpose as in Fig. 1, i.e. to connect a number $p$ of subsequent selector switches to the input of the preselector stages. The connections of the selector switches 11, 12 and 21, 22 to the subsequent selector switches 31 to 34, 41 to 44, 51 to 54, and 61 to 64, respectively, are provided in such a manner that the wiper arm inputs of the selector groups 3 to 6 in all of the required group combinations of four can be connected to the input of the preselector stages. In this way it is possible to select at any time four frequencies from the available frequencies $f_1$ to $f_{40}$, which can be distributed in any manner over the individual groups $f_1$ to $f_{10}$, $f_{11}$ to $f_{20}$, $f_{21}$ to $f_{30}$ and $f_{31}$ to $f_{40}$, respectively. Thus, several or all of the four frequencies may belong to one group, or each of the frequencies may belong to a different group.

Like parts in Figures 2*a* and 2*b* are provided with the same reference characters as in Figure 1. The equipment for actuating the selector switches may be the same as shown in Figure 1. Therefore, the telephone station 104 and the parts belonging thereto, as well as the photoelectric tone generator and the high frequency transmitter are omitted. The light sources to be connected to the output terminals 102 are merely indicated by the symbol of one lamp 117. In addition to the stepping magnets 111, 113 and 114 of Figure 1, additional stepping magnets 112, 115 and 116 are illustrated in Figures 2*a* and 2*b*. As in Figure 1, the apparatus 109 distributes the primary impulse series following one another to the various selector switch stages.

In accordance with the operations explained with reference to Fig. 1, the individual frequencies to be generated can be determined within the switch groups, after these groups are selected by actuation of the preselector stages. The individual frequencies are determined in this manner by consecutive actuation of the individual wiper arms of the groups 3, 4, 5 and 6, these arms being mounted on a common shaft.

After the primary call signal has completed its sequence, the wiper arms of the individual stages of the circuit arrangement according to the invention are in positions in accordance with the elements of this primary call signal. These positions are maintained for as long a period as the secondary call signal is to be transmitted. Consequently, the call apparatus has to be provided with an additional switching means which is adapted to permit manual shutting off of the call in case of no response by the party called, or to permit shutting off of the call when a counter signal is received from the called party answering the call. These features are of secondary importance with respect to the invention, so that the means to carry out their functions can be omitted in the circuits illustrated in the drawings.

The means to put the call out of operation has also to be adapted to return all of the selector units to their starting positions. This can be likewise carried out by means of conventional automatic switching apparatus.

The application of the invention is not limited to systems of the types of 20 digits taken 2 at a time and 40 digits taken 4 at a time described in the foregoing examples. If the selector stages 3, 4, 5 and 6, as for example shown in Figs. 2*a* and 2*b*, are equipped with 5-bank rather than with 4-bank selectors, and if of the available contacts of the preselector stages 9 rather than only 7 are employed, a conversion circuit for a system of the type of 50 digits taken 4 at a time can be designed in the same manner. Thus, the system described is adaptable to different requirements depending on the size of the network employed.

Although in accordance with the provisions of the patent statutes this invention is described as embodied in concrete forms and the principle of the invention has been explained together with the best modes in which it is now contemplated applying that principle, it will be understood that the elements, circuits and combinations shown and described are merely illustrative and that the invention is not limited thereto, since alterations and modifications will readily suggest themselves to persons skilled in the art without departing from the true spirit of the invention or from the scope of the annexed claims.

I claim:

1. In an apparatus for converting a primary call signal into a secondary call signal, said primary signal being a permutation of sequentially transmitted signal elements and said secondary signal being a combination of simultaneously transmitted dissimilar signal elements mutually superimposed, comprising a plurality of units, each of which when energized initiates a unique secondary signal element, which elements when combined form a secondary call signal; banks of multi-position selector switches, each position selecting a different one of said units; first mechanical actuating means for advancing the selector switches in unison; preselector switch means for determining which of said banks of selector switches will be energized; second mechanical actuating means for advancing said preselector switch means, said second actuating means being responsive to part of the sequential primary signal elements, and said first actuating means being responsive to the remainder of said sequential primary signal elements, each of said units comprising an electric lamp; power supply means connected to one side of each of said lamps and to said preselector switch means to energize lamps selected by said banks and by said switch means; and photo-electric generating means associated with each of said lamps for generating corresponding secondary signal elements.

2. A circuit for converting primary call signals including sequential series of impulses into secondary call signals characterized by simultaneous combinations of a plurality of frequencies, which are derived from a total number of available frequencies, comprising stages of pre-selector switches actuated by the initial pulses of the impulse series of the primary call signal, banks of subordinate selector switches, each bank being connected with one of said pre-selector switches, each output terminal of a pre-selector switch being connected to the input of a switch in the associated bank of subordinate selector switches so that each pre-selector switch terminal selects one subordinate selector switch in the associated subordinate bank, and subordinate bank actuating means controlling all of the subordinate switches in the bank and said actuating means being controlled in sequence by subsequent impulses of said primary call signal, the outputs of the individual selector switches of different subordinate banks being connected to form a conductor bank wherein each individual conductor is connected to a secondary-frequency generating circuit component, and power means connected with said subordinate selector switches and causing energization of said circuit components and transmission of a composite signal comprising corresponding frequencies of the secondary call signal.

3. A circuit according to claim 2, wherein said circuit components of the conductor banks comprise electric lamps forming sources of light, and photo-electric-tone generator means associated with the lamps and generating frequencies of the secondary call signal.

References Cited in the file of this patent

UNITED STATES PATENTS

| | | |
|---|---|---|
| 1,456,508 | Lindell et al. | May 29, 1923 |
| 1,567,223 | Albert | Dec. 29, 1925 |
| 2,116,372 | Weld | May 3, 1938 |
| 2,207,743 | Larson | July 16, 1940 |
| 2,457,149 | Herbst | Dec. 28, 1948 |
| 2,483,445 | Talley | Oct. 4, 1949 |
| 2,489,306 | McWhirter et al. | Nov. 29, 1949 |

FOREIGN PATENTS

| | | |
|---|---|---|
| 981,512 | France | Jan. 17, 1951 |